April 19, 1938. T. McGLAUGHLIN 2,114,799
MINING DRILL
Filed Jan. 21, 1937 2 Sheets-Sheet 1

Fig. 5.ª

WITNESSES
Chris Feinle.
A. L. Kitchin

INVENTOR
Thomas McGlaughlin,
BY
Munn Anderson & Riddy
ATTORNEYS

April 19, 1938.  T. McGLAUGHLIN  2,114,799
MINING DRILL
Filed Jan. 21, 1937   2 Sheets-Sheet 2

WITNESSES
Chris Feinle
T. L. Kitchin

INVENTOR
Thomas McGlaughlin
BY
Munn Anderson Reddy
ATTORNEYS

UNITED STATES PATENT OFFICE 2,114,799

MINING DRILL

Thomas McGlaughlin, Canton, Ill.

Application January 21, 1937, Serial No. 121,463

8 Claims. (Cl. 255—69)

This invention relates to mining drills, and particularly to a drill of the twisted type with teeth at the end, the object being to provide a drill which presents a novel form of removable teeth at the end together with cutting portions formed integral with the body of the drill.

Another object of the invention is to provide a drill having two or more removable cutting teeth formed with tapering shanks having all surfaces tapering to fit into a similar shaped socket in a drill head.

A further object of the invention is to provide a drill wherein the head carrying the teeth may be welded to the body of the drill or disengageably connected therewith.

An additional object of the invention, more specifically, is to provide a drill having cutting teeth formed with ribs and abutments so arranged that a cold chisel or other object may be driven against the same to force the shank of the tooth into a retaining socket.

An additional object is to provide a mining drill with removable teeth and sockets for receiving the shanks of the teeth together with means for temporarily locking the teeth in place so that they will not become lost when the drill is withdrawn from a hole.

In the accompanying drawings:

Fig. 5a is an edge view of the tooth shown in Fig. 5;

Referring to the accompanying drawings by numerals, 1 indicates the drill body which is provided with a head 2 adapted to be welded or secured to the body 1 in any desired manner. The head 2 is provided with enlargements or thickened portions 3 and 4 which are formed with sockets 5 and 6. As these sockets and associated parts are identical, the description of one will apply to both.

Figure 1:
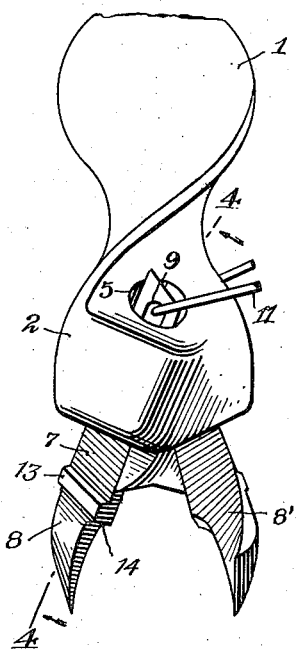
Fig. 1 is a side view of one end of a drill illustrating the head and a pair of teeth mounted therein.
Figure 2:
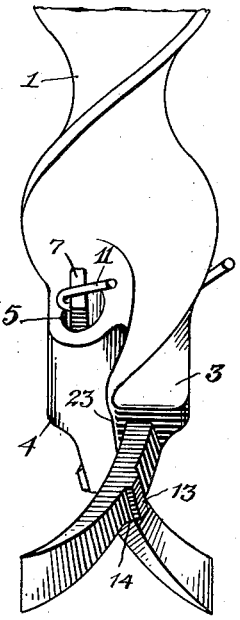
Fig. 2 is an edge view of the structure shown in Fig. 1.
Figure 3:
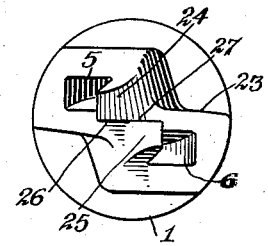
Fig. 3 is an end view of the structure shown in Fig. 1 with the teeth removed.
Figure 4:
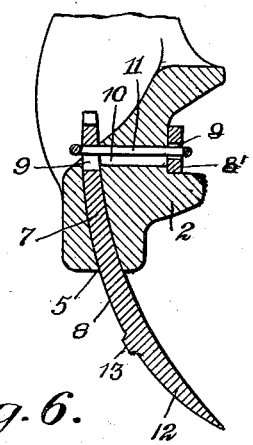
Fig. 4 is a fragmentary sectional view through Fig. 1 approximately on the line 4—4.

As illustrated particularly in Fig. 4, the socket 5 accommodates the shank 7 of tooth 8. It will be observed from this figure and also from Fig. 5 that the shank 7 tapers on all four sides and snugly fits at all points the socket 5. It will also be noted that the socket and the shank are both curved. The shank 7 is provided with an aperture 9 which is adapted to register with the passageway 10 in head 2 so that a wire or rod 11 may extend through the respective apertures 9 in the respective teeth 8 and 8'. It will be noted that the rod or wire is bent over as shown in Fig. 1 so as to be locked or held in place automatically. This rod or wire is not intended to hold the teeth tightly in place but intended to prevent the teeth from becoming lost when the drill is pulled out of a hole that has just been drilled.

During the drilling operation the pressure on the teeth will naturally hold them tightly in place. However, if they should become loose during the drilling operation by a great vibration, the rod 11 will hold the teeth in place so that they will continue to function in the usual manner. It will also be noted that the teeth are curved for their full length and are so positioned that they will cut or drill a hole slightly greater in diameter than body 1.

Figure 5:
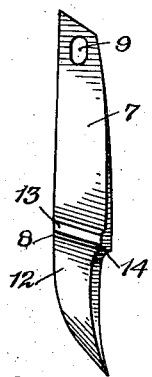
Fig. 5 is a front elevation of one of the teeth illustrated in Fig. 1.
Figure 5:
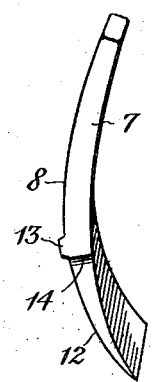
Figure 6:
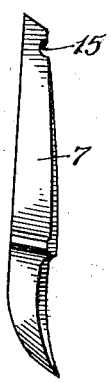
Fig. 6 is a view similar to Fig. 5 showing a slightly modified construction.
Figure 10:
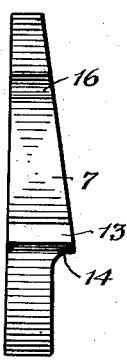
Fig. 10 is an elevation on a reduced scale of the tooth shown in Fig. 9.

From Figs. 5, 6 and 10 it will be seen that each of the drills is provided with a shank 7 which tapers on each side and each edge, said taper extending for the full length of the shank. The shank 7 merges into the body 12 of the tooth and forms a continuation thereof. At the juncture of the body 12 and the shank 7 there is provided an upstanding rib 13 and also a shoulder 14 which is shown more in detail in Fig. 10. The rib 13 and the shoulder 14 are provided in order that the teeth may be driven firmly into the respective sockets by a hammer or other implement, as for instance by placing a cold chisel against these members and then striking the cold chisel with a hammer.

Fig. 5 shows the aperture 9 in the small end of the shank, while in Fig. 6 the shank 7 is provided with a notch 15. This notch is used where the end of the shank is too narrow for an aperture. The rod 11 may be made comparatively small, as shown in Fig. 4, or made to substantially fit the passageway 10 and function to engage the shank 7 in aperture 9 or notch 15, as the case may be, to prevent the accidental removal of the tooth.

Figure 9:
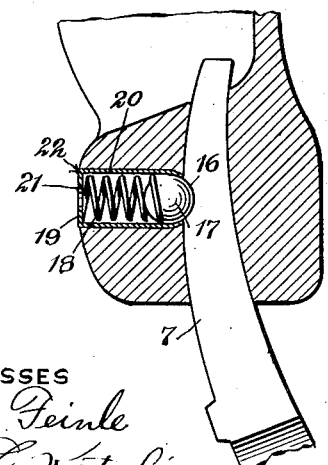
Fig. 9 is a sectional view through Fig. 7 approximately on the line 9—9.

In Fig. 10 a slightly modified structure is provided, wherein shank 7 is provided with a depression 16 for accommodating the ball 17. The ball 17 is continually pressed by the spring 18 acting against the end 19 of the sleeve 20. End 19 is provided with an aperture 21 to permit dust or other foreign matter to move out of the sleeve 20. The form of spring lock shown in Fig. 9 is desirable because it works very efficiently, but other forms of spring locks could be used without departing from this invention. In this form of the invention, as well as that shown in Fig. 4, the shank of each tooth projects beyond the enlargement in which it is mounted so that when the rod 11 is removed manually, the end of the shank may be struck by a hammer or other object so as to loosen the same. When striking the shank 7, as shown in Fig. 9, it will force the shank loose on the ball 17 and thereby allow the tooth to be removed.

Figure 7:
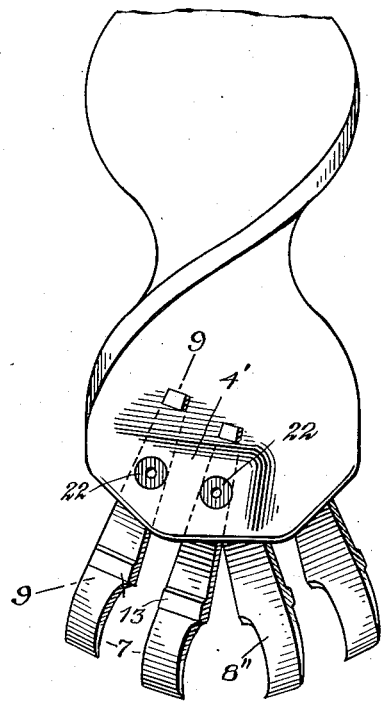
Fig. 7 is a view similar to Fig. 1 but showing a modified form wherein a plurality of pairs of teeth are accommodated.
Figure 8:
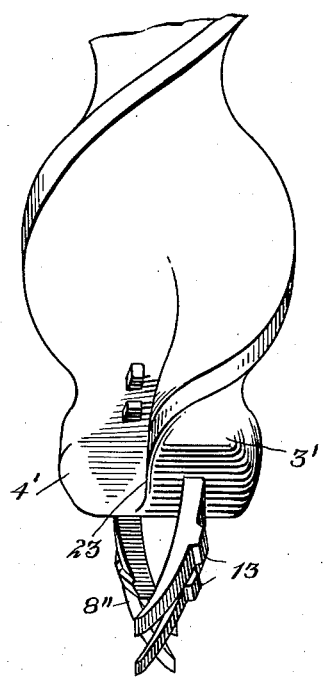
Fig. 8 is an edge view of the structure shown in Fig. 7.

In Figs. 7 and 8 a modified form of the invention is shown wherein a plurality of pairs of teeth are used instead of two single teeth. It will be evident that any number of teeth could be used by providing the proper number of sockets. As shown in these figures, there are four teeth 8" fitting into sockets similar to sockets 5 and 6 and held against accidental removal by the respective spring locks 22. In this form of the invention the respective edges 23 form cutting edges to a limited extent to clear away some of the material more or less broken by the teeth 8'. These cutting edges are on the opposite side to the respective enlargements 3' and 4'.

In all forms of the invention the sockets are tapering and also preferably curved with the shanks of the teeth formed in a similar manner so that the teeth may be driven firmly into position. In driving the teeth into position it is not necessary to strike the cutting end of the teeth as the ribs 13 and the shoulder 14 may be used. This arrangement permits the pressure of the drill against the teeth during the drilling operation to tighten the teeth within the sockets. This automatic tightening of the teeth maintains the teeth in rigid connection with the drill and consequently causes the teeth to function in an efficient manner as the drill is rotated.

I claim:

1. A mining drill having a plurality of enlargements on the rear adjacent the cutting edge thereof, each enlargement having an arc-shaped socket extending entirely therethrough and substantially longitudinally of the drill, each of said sockets having the various walls tapering from said cutting edge toward the shank of the drill, said sockets diverging, and a tooth for each of said sockets formed with a cutting portion and a shank shaped identical with said sockets whereby any tooth may fit any socket and the shank frictionally engage all of the walls of the socket.

2. A mining drill having a pair of enlargements at one end, each of said enlargements having a socket extending entirely therethrough, said drill also having a transverse aperture extending from one socket to the other, a tooth for each of said sockets, each of said teeth having an opening in the shank and a metallic member extending through said aperture and the openings in said teeth to prevent loss of the teeth as the drill is withdrawn from a drilling operation.

3. In a mining drill, a tooth therefor comprising an arc-shaped shank, a body formed with a cutting edge, and a rib extending from the tooth adjacent the juncture of the shank and body.

4. In a mining drill, a tooth therefor comprising a body, a shank, and an abutment projecting normal to the surface of the tooth, said tooth being formed with a shoulder for receiving a hammer or other tool adapted to force the tooth into functioning position.

5. A tooth for a drill comprising a body having a cutting edge at one end, a shoulder at the opposite end, a shank tapering for its full length, and a rib positioned substantially at the juncture of the body and shank.

6. A mining drill having a twist drill body and a head, said head having a plurality of pairs of arc-shaped sockets extending entirely through the head and substantially longitudinally of the drill, spirally extending teeth having shanks of the same shape as said sockets fitted therein and positioned to cut a bore of greater diameter than said body, and spring means for normally locking said teeth against accidental removal.

7. A drill for drilling coal and other substances comprising a twist drill body formed with cutting edges and integral enlargements on the rear faces of the portions of the drill having said cutting edges, each enlargement having a substantially tangentially arranged tapering arc-shaped socket open at both ends and extending generally longitudinally of the drill, a cutting tooth fitted into and substantially filling all parts of each of said sockets, each of said teeth extending through and slightly beyond said enlargements so that the rear ends of the teeth may be struck for removing the teeth from the enlargements, and means for normally locking said teeth in position.

8. A mining drill comprising a twist drill body having at one end a pair of inclined cutting edges tapering from the sides to near the axis of the body, said body being formed with integral enlargements on the rear faces of the portions of the drill having said cutting edges, said enlargements being arranged adjacent said cutting edges and provided with curved sockets extending generally longitudinally of the drill and entirely through said enlargements and tapering from one end to the other, and a cutting tooth fitted into and substantially filling all parts of each of said sockets, said cutting teeth having tapering shanks shaped to substantially fit said sockets.

THOMAS McGLAUGHLIN.